United States Patent [19]

Akiba et al.

[11] Patent Number: 4,549,171
[45] Date of Patent: Oct. 22, 1985

[54] FLOATING OIL LEAK DETECTOR

[75] Inventors: Juji Akiba; Satoru Kobayashi, both of Hitaka; Hiroyuki Sugibuchi, Hoya, all of Japan

[73] Assignee: Junkosha Company Ltd., Tokyo, Japan

[21] Appl. No.: 568,058

[22] Filed: Jan. 4, 1984

[30] Foreign Application Priority Data

Jan. 28, 1983 [JP] Japan .................... 58-11840[U]

[51] Int. Cl.$^4$ ............................................ G08B 21/00
[52] U.S. Cl. ................................ 340/605; 73/61 R;
73/322.5; 340/624; 340/603
[58] Field of Search .............. 73/61.1 R, 308, 313,
73/319, 53, 322.5, 321; 340/603, 605, 623, 624,
695

[56] References Cited

U.S. PATENT DOCUMENTS

| 3,603,952 | 9/1971 | Smith | 340/603 X |
| 3,874,223 | 4/1975 | Miyazaki et al. | 73/53 X |
| 3,885,418 | 5/1975 | Kriebel | 73/61.1 R |
| 3,913,384 | 10/1975 | Furuya et al. | 73/53 |
| 3,946,625 | 3/1976 | Miyazaki et al. | 73/61.1 R |

FOREIGN PATENT DOCUMENTS

| 2940193 | 4/1981 | Fed. Rep. of Germany | 340/605 |
| 1131299 | 10/1968 | United Kingdom | 340/624 |

Primary Examiner—Charles Hart
Attorney, Agent, or Firm—Mortenson & Uebler

[57] ABSTRACT

Oil floating on the surface of a body of water can be detected by the floating sensor of this invention which comprises a float having a central opening vertically therethrough and containing an electrical sensor, the lead wire connected to the sensor extending downwardly through the opening, forming a U-bend and extending upwardly through the opening to alarm means. A weight at the U-bend provides for automatic height adjustment of the detector as the surface of the body of water raises or lowers.

5 Claims, 3 Drawing Figures

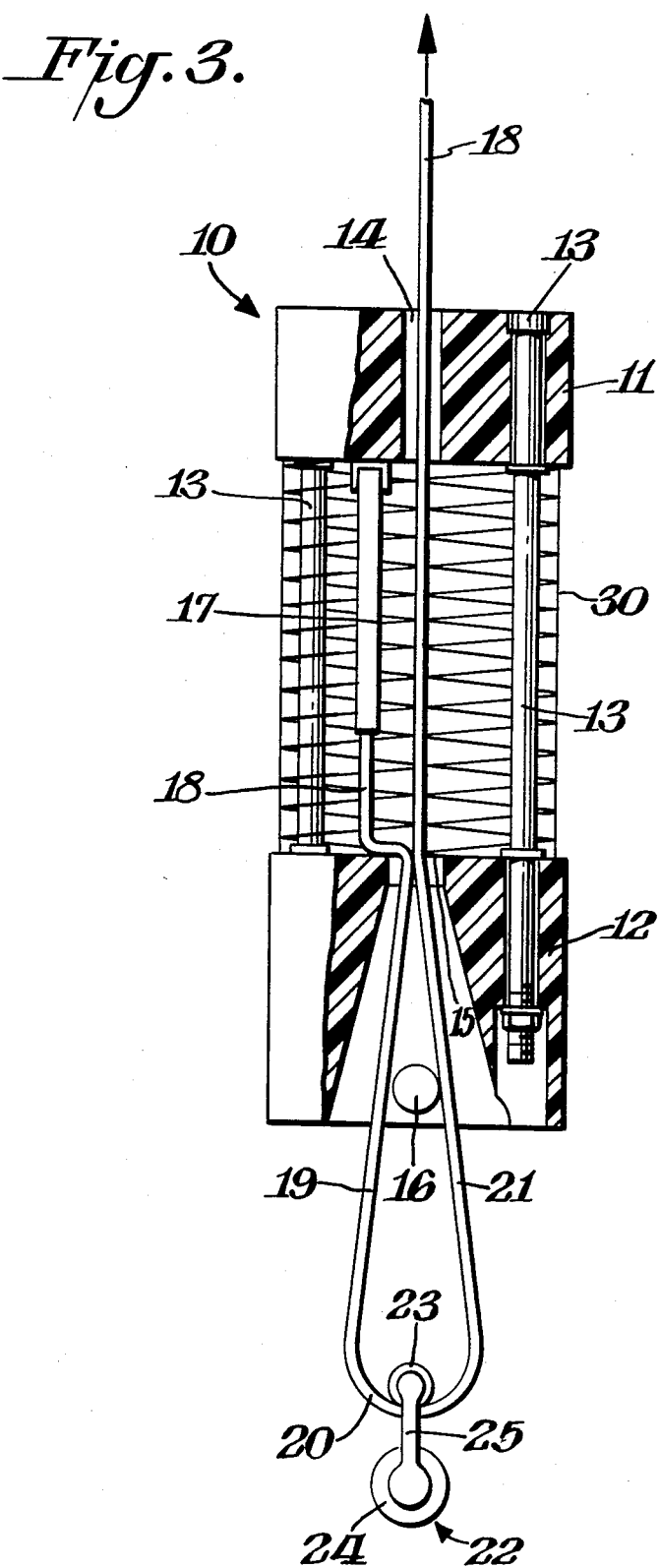

FLOATING OIL LEAK DETECTOR

BACKGROUND OF THE INVENTION

The present invention relates to floating apparatus, or the like, to detect the presence of an oil membrane on a water surface, or changes in physical or chemical properties on liquid surfaces, in general, and which performs such detection uninterrupted by elevation or lowering of the liquid level.

Generally, a detecting apparatus which floats on a liquid has an electrical sensor provided with a lead wire whose length is equal to the lowest liquid level to be expected. When the liquid level rises from this lowest level, the lead wire slackens. In such a conventional apparatus, the slackened lead wire is often caught on other members in a liquid vessel. Further, the lead wire tends to get stiff resulting from weather changes or aging. As such, the floating of the apparatus can be hindered and, hence, its appropriate detecting ability can be lost.

Accordingly, it is an object of the present invention to provide a floating detecting apparatus which is free of the foregoing difficulties with the prior art apparatus and which has a lead wire that does not hinder the floating of the apparatus.

SUMMARY OF THE INVENTION

A floating leak detecting apparatus is provided comprising a float assembly having an opening extending vertically therethrough, a sensor anchored to the float, a lead wire electrically connected to the sensor and guided in such a way that it extends downwardly from the float, makes a U-turn, returns upwardly and extends out through the opening in the float upwardly, the wire having a weight disposed at the U-turn for weighting down the lead wire. The lead wire is preferably coated with fluorocarbon resin. The weight may include a roller or pulley which is in contact with the lead wire at the U-turn of the wire. The float assembly may include a guide roller to guide and separate the upwardly extending portion of the lead wire from the downwardly extending portion. The float assembly may comprise a lower float and an upper float connected to the lower float, the sensor being anchored between the lower and upper floats.

BRIEF DESCRIPTION OF THE DRAWINGS

FIG. 3 is a side elevation, partly in cross section, of the leak detector of this invention.

DETAILED DESCRIPTION OF THE INVENTION AND PREFERRED EMBODIMENTS WITH REFERENCE TO THE DRAWINGS

Oil floating on the surface of a body of water can be detected by the floating sensor of this invention which comprises a float having a central opening vertically therethrough and containing an electrical sensor, the lead wire connected to the sensor extending downwardly through the opening, forming a U-bend and extending upwardly through the opening to alarm means. A weight of the U-bend provides for automatic height adjustment of the detector as the surface of the body of water raises or lowers.

The object of this invention is achieved by a floating detecting apparatus which comprises a float provided with an opening extending vertically therethrough, a sensor housed in the float, a lead wire electrically connected to the sensor and guided in such a way that it extends through the opening(s) downwardly from the float, makes a U-turn, returns upwardly through the opening(s), and having a weight disposed at the U-turn of the lead wire for holding down the lead wire. In this construction, if the lead wire is coated with fluorocarbon resin, the wire can slide well on the neighboring parts, and therefore the wire will not adversely affect the floating force of the float. Further, it is convenient to add a roller or pulley assembly to the weight such that a load is applied to the wire through the roller or pulley, and the wire is then weighted down satisfactorily. It is also possible to mount a guide roller to the float to guide and separate the upwardly extending portion of the lead wire from the downwardly extending portion to ensure that the lead wire is held down. The float may consist of an upper float and a lower float connected to the upper one in such a way that the sensor is anchored between both floats. This structure allows adjustment of the detecting apparatus to set it for a specific object.

According to the floating detecting apparatus constructed as described thus far, the lead wire is pulled below the float at all times depending on the height of the float. Consequently, the wire is not caught on any other member, and detection regardless of liquid level is assured. In cases where the lead wire is coated with a fluorocarbon resin, the wire can slide well on the neighboring member. Further, the wire exhibits stabilty against wide temperature changes and various chemicals, and reliability is provided for the apparatus. A conventional apparatus as well as the invention is best described in detail with reference to the drawings.

Figure 1:
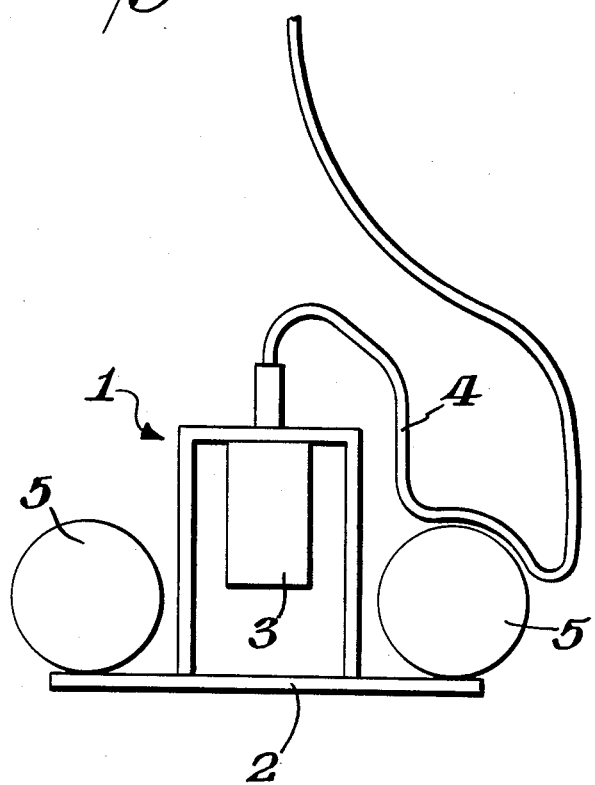
FIG. 1 depicts schematically, in side elevation, a conventional floating leak detector.

FIG. 1 shows a conventional floating detecting apparatus 1 which is comprised of a frame 2, a sensor 3 mounted to the frame 2, a lead wire 4 brought out from the sensor 3, and floats 5 affixed to the frame 2. In this apparatus 1, if the liquid level rises, the wire 4 slackens. The result is that the floating force of one of the floats 5 may be reduced as shown. Or, the wire may be caught on another member. Particularly, when the liquid level rises rapidly, such an undesirable situation arises frequently. Also, when the wire 4 gets stiff because of temperature, aging, oxidation, or other causes, floating of the apparatus 1 is hindered to a great extent. This leads to unreliability of detection of the sensor 3.

Figure 2:
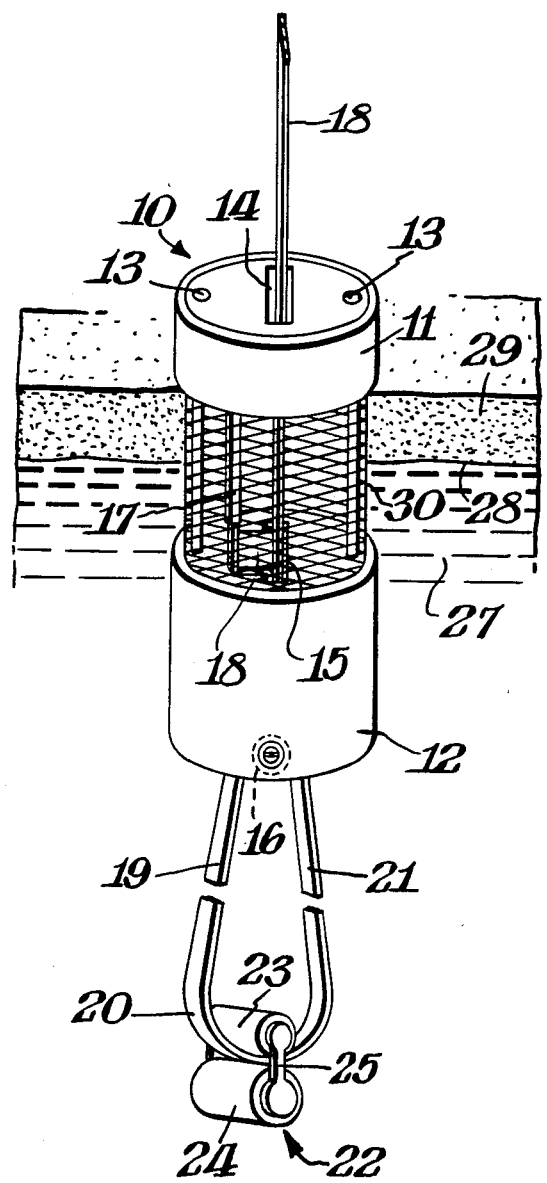
FIG. 2 is a schematic, perspective view of the leak detector according to the invention.

Referring to FIG. 2, there is shown a floating detecting apparatus embodying the concept of the invention and being substantially free of the foregoing difficulties with the prior art apparatus. The novel apparatus 10 includes a float assembly consisting of an upper float 11 and a lower float 12 which is connected to the float 11 by means of two bolts 13. The upper float 11 is provided with an opening 14 extending vertically through the float. Similarly, the lower float 12 has an opening 15 extending vertically through it. The opening 15 widens out downwardly, and a guide roller 16 is disposed at the lower end of this opening.

Anchored between the floats 11 and 12 is a sensor 17 to which a lead wire 18 in the form of a ribbon cable is electrically connected. The wire 18 is coated with fluorocarbon resin and is guided in such a way that it extends downwards as a downwardly extending portion 19, makes a U-turn at 20, and then extends upwards from the turn 20 via the roller 16 as an upwardly extending portion 21. A weight 22 is attached to the turn 20 formed at the lowest end of the wire 18 to pull the wire down. The weight 22 comprises a guide roller 23 placed in contact with the wire 18, a weight roller 24, and a frame 25 securing the roller 24 to the roller 23. In this example, the lead wire 18 takes the form of ribbon cable and so the weight 22 is comprised of the roller 23, 24 and the frame 25. In a case where the lead wire is a round cable, a guide V-pulley (not shown) may be used instead of the guide roller 23 so that any arbitrary weight may depend from the center of the V-pulley.

When liquid level 28 rises, the detecting apparatus 10 constructed as described above and floating in liquid 27, such as water, is moved upwards. Then, the weight 22 pulls the two portions 19 and 21 of the lead wire while maintaining these portions in aligned condition. As the apparatus 10 rises higher, the turn 20 of the wire 18, that is, the position of the weight 22, is moved further away from the lower float 12. If a membrane of a fluid having a small specific gravity such as oil 29 is created on the surface 28 of the liquid 27, the oil 29 will pass through the protective net 30, preferably made of plastic, formed between the floats 11 and 12 and then it will reach the sensor 17. Thus, inflow of the oil 29 can be sensed smoothly and certainly, irrespective of liquid level. Inversely, if the liquid level 28 lowers, the apparatus 10 is lowered accordingly. The turn 20 of the wire 18, that is, the weight 22, is moved closer toward the lower float 12. Again, the two portions 19 and 21 of the lead wire are automatically aligned well according to the liquid level 28. The detecting apparatus is smoothly moved by change in the liquid level 29, and detection of the oil 29 on the liquid is effected certainly without substantial error.

In one feature of the invention, the float comprises the upper float 11 and the lower float 12. Hence, the position of the sensor 17 can be held stably at any desired position in relation to the weight 22. Further, in case of multilayer liquid, the position of the sensor can be conveniently set.

As described herein, a novel detecting apparatus is provided comprising the float provided with the hole extending vertically therethrough, the sensor anchored to the float, the lead wire electrically connected to the sensor and guided in such a way that it extends downwardly from the float, makes a U-turn, returns upwardly, and extends out through the hole in the upper float upwardly, and the weight disposed at the U-turn of the lead wire for pulling down the lead wire pulls down the two portions of the wire automatically in response to changes in liquid level while keeping the two portions in aligned condition, thus ensuring smooth movement of the apparatus. Therefore, detection is effected with certainty in response to change in liquid level, resulting in high reliability. Especially when the lead wire is coated with fluorocarbon resin, the wire is stable over a wide range of temperature and capable of sliding. A further advantage is that it is quite stable physically and chemically.

It is to be understood that the present invention is not limited to the above embodiment. For example, the lead wire may take the form of round cable. The weight including the rollers may be replaced by a combination of a pulley and a desired weight. Further, the float may consist of a single unit. Obviously, many modifications and changes may be made thereto without departing from the spirit and scope of the invention.

While the invention has been disclosed herein in connection with certain embodiments and detailed description, it will be clear to one skilled in the art that modifications or variations of such details can be made without deviating from the gist of this invention, and such modifications or variations are considered to be within the scope of the claims hereinbelow.

What is claimed is:

1. A floating leak detecting apparatus comprising:
   a float assembly provided with an opening extending vertically therethrough,
   a sensor anchored to said float,
   a lead wire electrically connected to said sensor and guided in such a way that it extends downwardly from said float, makes a U-turn, returns upwardly and extends out through the opening in said float upwardly and thence to alarm means, said wire having a moveable weight disposed at the U-turn for weighting down said lead wire.

2. A floating detecting apparatus as set forth in claim 1, wherein the lead wire is a wire coated with fluorocarbon resin.

3. A floating detecting apparatus as set forth in claim 1, wherein said weight includes a roller or pulley which is in contact with the lead wire at said U-turn of the wire.

4. A floating detecting apparatus as set forth in claim 1, wherein said float assembly includes a guide roller to guide and separate said upwardly extending portion of said lead wire from said downwardly extending portion.

5. A floating detecting apparatus as set forth in claim 1 wherein said float assembly comprises a lower float and an upper float connected to said lower float, said sensor being anchored between the lower and upper floats.

* * * * *